United States Patent Office 3,169,830
Patented Feb. 16, 1965

3,169,830
PRODUCTION OF IODINE FROM MOLTEN LITHIUM IODIDE
Jennings B. Du Bois, Jr., Pasadena, Tex., assignor to Shell Oil Company, New York, N.Y., a corporation of Delaware
No Drawing. Filed Oct. 18, 1963, Ser. No. 317,128
5 Claims. (Cl. 23—216)

This invention relates to an improved process for the production of elemental or free iodine from lithium iodide. More particularly, it relates to production of iodine by oxygenative oxidation of lithium iodide at an elevated temperature at which the lithium iodide is in a molten state.

It has recently been proposed (Nager, U.S. 3,080,435, issued March 5, 1963) to dehydrogenate organic compounds by a process involving: (1) iodinative dehydrogenation of the organic compound by reaction with elemental iodine in a molten metal iodide environment with the production of the dehydrogenated compound and hydrogen iodide, (2) immediate reaction of the produced hydrogen iodide with the corresponding metal oxide or hydroxide in the dehydrogenation zone to produce the metal iodide, and (3) regenerating elemental iodine from the metal iodide, either in the dehydrogenation zone or in a separate oxidation zone, by reaction with elemental or free oxygen under conditions such that the metal iodide is in a molten state. The use of lithium iodide as the metal iodide has been disclosed as a particularly useful metal iodide for the process. However, it has been found that when lithium iodide is utilized in this dehydrogenation process, the efficiency of the oxygenative oxidation of the lithium iodide to elemental iodine is often lower than desirable and that the physical condition of the molten mass changes with time and insoluble, inorganic material is formed with the resultant tendency to plug equipment, and thereby impair operation of the process.

It is a principal object of this invention to improve the oxygenative oxidation of lithium iodide in the molten state to produce free iodine and at the same time to minimize the production of insoluble inorganic material in the system.

Now, in accordance with the present invention, it has been found that the efficiency of oxygen utilization in the oxidation of lithium iodide to produce free iodine is enhanced, and the formation of undesirable, insoluble inorganic material in the system is substantially reduced by effecting the high temperature reaction of the oxygen with the lithium iodide in the presence of approximately a stoichiometric amount, with respect to the oxygen, of water, or an excess thereof, while maintaining the system at a temperature of from about 400° C. to 650° C.

It has been found that when oxygen is reacted with molten lithium iodide in the absence of water, lithium paraperiodate is formed and that after a substantial amount of reaction has been effected, e.g. more than about 5% of the lithium iodide, the amount of lithium paraperiodate, which is an insoluble solid, is sufficient to represent a material reduction in efficiency of utilization of the oxygen for liberating iodine and to modify the physical character of the system so as to change its flow characteristics and tend to plug the reactor. It has been found further that when the oxidation is carried out in the presence of sufficient water to react with lithium oxide formed by reaction of oxygen with lithium iodide, the amount of lithium paraperiodate formed is substantially reduced.

A better understanding of the invention will be obtained by consideration of the results of a series of runs, in some of which dry oxygen was passed into molten lithium iodide at 566° C. (1050° F.), and in some of which a mixture of oxygen and steam in a 1:1 mol ratio was passed into molten lithium iodide under similar conditions. The results of the runs with dry oxygen are given in Table 1, while the results with the runs of mixtures of oxygen and steam are given in Table 2.

TABLE 1
*Dry oxygen results*

| | | | | | | | | |
|---|---|---|---|---|---|---|---|---|
| Orig. wt of LiI (g.) | 13.937 | 13.857 | 14.015 | 13.992 | 14.135 | 14.051 | 13.893 | 13.949 |
| Wt. of residue (g.) | 11.331 | 9.602 | 9.037 | 8.613 | 7.895 | 7.850 | 7.662 | (¹) |
| Percent Wt. in residue: | | | | | | | | |
| LiI | 93.4 | 85.9 | 84.1 | 83.8 | 74.8 | 74.2 | 72.5 | 64.0 |
| Li₂O | 3.9 | 6.0 | 6.4 | 7.9 | 7.4 | 11.0 | 8.5 | 9.6 |
| Li₅IO₆ | 2.7 | 8.1 | 9.5 | 8.3 | 17.8 | 14.8 | 19.0 | 26.4 |
| Percent Wt. LiI used | 24.1 | 40.5 | 45.8 | 48.4 | 58.2 | 58.6 | 60.1 | (¹) |
| Wt. of free I₂ (g.) | 3.02 | 4.79 | 5.57 | 5.98 | 7.01 | 6.96 | 7.13 | 9.46 |
| Percent Wt. of I₂² | 89.9 | 85.4 | 86.8 | 88.3 | 85.2 | 84.6 | 85.5 | (¹) |

¹ Not determined.
² Based on LiI converted.

TABLE 2
*Oxygen/steam mixture results*

| | | | | | |
|---|---|---|---|---|---|
| Orig. wt. of LiI (g.) | 13.768 | 13.840 | 13.902 | 13.832 | 13.858 |
| Wt. of residue (g.) | 10.330 | 9.265 | 6.019 | 5.133 | 4.680 |
| Percent Wt. in residue: | | | | | |
| LiI | 91.7 | 86.6 | 67.0 | 56.8 | 53.7 |
| LiOH | 7.7 | 12.0 | 28.1 | 33.4 | 36.9 |
| Li₅IO₆ | 0.6 | 1.5 | 4.9 | 9.7 | 9.3 |
| Percent Wt. LiI used | 31.2 | 42.0 | 71.0 | 78.9 | 81.9 |
| Wt. of free I₂ (g.) | 3.97 | 5.19 | 8.93 | 9.67 | 10.25 |
| Percent Wt. of I₂¹ | 92.4 | 89.2 | 90.5 | 88.6 | 90.4 |

¹ Based on LiI converted.

The results given in Table 1 show that as the percent by weight of lithium iodide reacted increases, which increased with an increase of oxygen used, the proportion of lithium iodide which was converted to lithium paraperiodate increased substantially out of proportion to the production of lithium oxide. The liberated iodine is expressed as a percentage of the lithium iodide decomposed; there are upper and lower limits to this percentage. The upper limit is at 94.8% and corresponds to the percentage weight of iodine in lithium iodide, and the lower limit is at four-fifths this value (75.9%) and corresponds to total lithium paraperiodate formation. In the latter case, complete conversion of lithium iodide to lithium paraperiodate results in the retention of one-fifth of the available iodine in the residue.

As already indicated, as far as the operation of the iodinative dehydrogenation process is concerned, several undesirable consequences result. The maximum yield of iodine is not obtained since some of it, along with some of the feed oxygen is retained as lithium paraperiodate, and further, the lithium paraperiodate is solid at reaction temperature and tends to plug the reactor.

Fortunately, as shown by the results in Table 2, the foregoing undesirable consequences are alleviated substantially by passing steam into the oxidation zone along with the oxygen. The results in Table 2 show that the amount of lithium paraperiodate formed is reduced substantially and correspondingly more free iodine is produced. Furthermore, the major constituent of the inorganic residue, besides lithium iodide, is lithium hydroxide which melts at 463° C. (865° F.) and which is completely miscible with lithium iodide in all proportions at a temperature above its melting point; they are miscible above 400° C. in proportions from about 15 mol percent lithium hydroxide to about 90 mol percent lithium hydroxide.

When used in connection with the iodinative dehydrogenation, e.g. as disclosed in U.S. 3,080,435, and wherein the molten lithium iodide is separately oxidized by free oxygen to liberate free iodine to be used in a separate dehydrogenation zone, the present invention is particularly useful for oxidizing from about 5% to about 75% of the lithium iodide in the molten lithium iodide composition withdrawn from the dehydrogenation zone; that is, an amount of oxygen is utilized to effect an oxidation of 5–75% of the lithium iodide. Of course, if desired, essentially complete oxidation of the iodide may be carried out.

Investigation seems to indicate that two reactions are involved in the formation of the undesirable lithium paraperiodate. The first reaction, which is a relatively fast reaction within the high temperature range indicated hereinbefore (400–650° C.), is the reaction of lithium iodide and oxygen to form lithium oxide and iodine, in accordance with the equation $$4LiI + O_2 = 2Li_2O + 2I_2$$

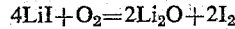

The second reaction, a much faster reaction, is the reaction of the formed lithium oxide with lithium iodide and oxygen to form lithium paraperiodate, in accordance with the equation:

$$2Li_2O + LiI + 2O_2 = Li_5IO_6$$

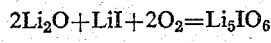

The addition of excess water (steam) to the oxidation system minimizes the formation of lithium paraperiodate. This is accomplished by obstructing the second of the foregoing reactions, possibly by reaction with the formed lithium oxide to yield lithium hydroxide, since the steam does not react with the lithium paraperiodate.

As already indicated in the series of runs, the results of which are given in Table 2, the water may be introduced as steam admixed with the oxygen. However, as will be readily understood by those skilled in this art, the water may be introduced by other means. For example, it may be introduced to the oxidation zone admixed with a portion of lithium iodide and/or lithium hydroxide as an aqueous solution. The reaction conditions and reaction zone, of course, will be selected so as to insure the presence of the essential reactants, oxygen, steam and lithium iodide, with the lithium iodide being in a molten state at a temperature of from 400–650° C. The use of an excess of water is advantageous so as to insure rapid and complete reaction of lithium oxide as formed to lithium hydroxide, from about 1 to 5 stoichiometric proportions being adequate. Larger proportions may be used without adverse effects except for the useless dilution of the liberated iodine.

Thus, the present invention provides a process for the reaction of oxygen with lithium iodide in a molten system which consists essentially of lithium iodide in a single phase mixture with any proportion of lithium hydroxide, at a temperature from about 400° C. to 650° C. in the presence of an amount of water corresponding to the lithium oxide formed by the reaction of the oxygen with lithium iodide, or an excess of water, with a substantial reduction in the production of lithium paraperiodate and an enhancement in the utilization of the oxygen to produce free iodine.

The invention claimed is:

1. A process for the production of free iodine from lithium iodide while minimizing the formation of lithium paraperiodate by reacting lithium iodide in molten state at a temperature of from 400 to 650° C. with elemental oxygen in amount sufficient to oxidize from about 5% to 75% of the lithium iodide and at least about a stoichiometric amount of steam based on the oxygen reacted.

2. A process in accordance with claim 1 wherein the temperature is about 550° C.

3. A process in accordance with claim 1 wherein the lithium iodide is present as an essentially single liquid phase with lithium hydroxide.

4. A process in accordance with claim 1 wherein the amount of water is from 1 to 5 times the stoichiometric amount of lithium oxide formed by the oxidation.

5. A process in accordance with claim 1 wherein the oxygen and steam are used in a 1:1 mole ratio.

References Cited by the Examiner

UNITED STATES PATENTS

| | | | |
|---|---|---|---|
| 1,324,761 | 12/19 | Carter | 23—218 |
| 1,329,457 | 2/20 | Carter | 23—218 |
| 3,044,862 | 7/62 | Paul | 23—218 X |

OTHER REFERENCES

Beck et al.: Serial No. 292,742, published July 13, 1943.

MAURICE A. BRINDISI, *Primary Examiner.*